US008721311B2

(12) United States Patent
Thomas et al.

(10) Patent No.: US 8,721,311 B2
(45) Date of Patent: May 13, 2014

(54) WINDSHIELD REPAIR APPARATUS

(71) Applicant: TCG International, Inc., Burnaby, CA (US)

(72) Inventors: Jonathan Thomas, Maple Lake, MN (US); Keith Beveridge, Edina, MN (US); David Osland, Minneapolis, MN (US)

(73) Assignee: TCG International Inc., Burnaby, B.C. (CA)

( * ) Notice: Subject to any disclaimer, the term of this patent is extended or adjusted under 35 U.S.C. 154(b) by 0 days.

(21) Appl. No.: 13/834,146

(22) Filed: Mar. 15, 2013

(65) Prior Publication Data

US 2013/0251831 A1   Sep. 26, 2013

Related U.S. Application Data

(60) Provisional application No. 61/613,749, filed on Mar. 21, 2012.

(51) Int. Cl.
*B29C 73/02*  (2006.01)
*B32B 43/00*  (2006.01)

(52) U.S. Cl.
USPC ............... 425/12; 156/94; 264/36.21; 425/13

(58) Field of Classification Search
USPC ........... 425/11, 12; 264/32.21, 36.22; 156/94, 156/98; 427/140
See application file for complete search history.

(56) References Cited

U.S. PATENT DOCUMENTS

| 4,249,869 | A | * | 2/1981 | Petersen ........................ 425/13 |
| 4,291,866 | A | | 9/1981 | Petersen |
| 4,919,602 | A | * | 4/1990 | Janszen ........................... 425/12 |
| 4,954,300 | A | | 9/1990 | Dotson |
| 5,104,304 | A | | 4/1992 | Dotson |
| 5,328,649 | A | * | 7/1994 | Newsome ................... 264/36.21 |
| 5,565,217 | A | | 10/1996 | Beckert et al. |
| 5,614,046 | A | * | 3/1997 | Campfield ....................... 156/94 |
| 5,622,726 | A | * | 4/1997 | Tanner ............................ 425/12 |
| 5,643,609 | A | * | 7/1997 | Jan .................................. 425/12 |
| 5,643,610 | A | | 7/1997 | Beckert et al. |
| 5,776,506 | A | | 7/1998 | Thomas et al. |
| 5,792,480 | A | | 8/1998 | Thomas |

(Continued)

OTHER PUBLICATIONS

International Search Report and Written Opinion for PCT/CA2013/050231 mailed May 15, 2013.

(Continued)

*Primary Examiner* — Yogendra Gupta
*Assistant Examiner* — Emmanuel S Luk
(74) *Attorney, Agent, or Firm* — Merchant & Gould P.C.

(57) ABSTRACT

A windshield repair apparatus includes a bridge for holding an injector adjacent to a break area of a windshield. The bridge includes a suction cup for mounting the bridge to the windshield. An articulating arm mounts to the bridge for holding equipment, such as a flashlight, a tool holder, and/or a sun blocker. The bridge includes a pivotally mounted arm which allows for pivotal movement of the injector away from the break area, and a registration system which allows for accurate replacement of the injector over the break area following pivotal movement back toward the break area. The arm also is pivotally moveable toward and away from the windshield and is controlled by a threaded adjustment mechanism. The injector is also threadably adjustable vertically relative to the windshield. The articulating arm includes a quick connect/disconnect feature.

38 Claims, 22 Drawing Sheets

(56) References Cited

U.S. PATENT DOCUMENTS

| | | |
|---|---|---|
| D398,496 S | 9/1998 | Thomas et al. |
| D403,563 S | 1/1999 | Thomas et al. |
| D406,029 S | 2/1999 | Thomas et al. |
| 5,948,331 A | 9/1999 | Beckert et al. |
| 5,952,012 A | 9/1999 | Thomas et al. |
| 5,954,901 A * | 9/1999 | Henderson ............. 156/94 |
| 6,024,901 A | 2/2000 | Thomas et al. |
| 6,042,353 A | 3/2000 | Thomas et al. |
| 6,050,799 A | 4/2000 | Galyon |
| 6,139,300 A | 10/2000 | Thomas et al. |
| 6,187,124 B1 * | 2/2001 | Campfield ............. 156/94 |
| 6,302,670 B1 | 10/2001 | Thomas et al. |
| D452,124 S | 12/2001 | Thomas et al. |
| 6,338,619 B1 * | 1/2002 | Rusch ............. 425/11 |
| 6,561,778 B2 * | 5/2003 | Evans ............. 425/12 |
| 6,663,371 B2 * | 12/2003 | Curl ............. 425/12 |
| 7,125,507 B2 * | 10/2006 | Evans ............. 264/36.21 |
| 7,993,121 B1 * | 8/2011 | Chan ............. 425/13 |
| 8,591,211 B2 * | 11/2013 | Lin et al. ............. 425/12 |
| 2002/0031564 A1 * | 3/2002 | Beveridge ............. 425/12 |
| 2002/0058080 A1 * | 5/2002 | Curl ............. 425/12 |
| 2004/0067272 A1 * | 4/2004 | Evans ............. 425/12 |
| 2011/0217482 A1 | 9/2011 | Thomas et al. |

OTHER PUBLICATIONS

Design U.S. Appl. No. 29/416,387, filed Mar. 21, 2012 entitled Windshield Repair Bridge.

* cited by examiner

US 8,721,311 B2

WINDSHIELD REPAIR APPARATUS

CROSS-REFERENCE PARAGRAPH

The present application claims the benefit of U.S. Provisional Application No. 61/613,749, filed Mar. 21, 2012, and titled "Windshield Repair Apparatus," the disclosure of which is hereby incorporated herein by reference.

FIELD OF THE INVENTION

The present invention relates to apparatus and methods for repairing breaks in windshields.

BACKGROUND

From time to time, a vehicle windshield will break, such as due to an object impacting against the windshield. A bull's-eye break may occur wherein the outer layer of safety glass incurs a break in the shape of an inverted cone. Other break shapes and cracks may be incurred in addition to or instead of the bull's-eye break. The inside layer of safety glass is typically unbroken. U.S. Pat. No. 4,291,866, issued Sep. 29, 1981, the disclosure of which is hereby incorporated by reference, illustrates an apparatus usable to repair a break in a vehicle windshield. The apparatus disclosed in the '866 reference includes a support apparatus for supporting an injector held against the windshield so that repair material can be applied to the break site. A repaired windshield is desirable over replacement of the windshield which can be quite costly, and time consuming.

Various concerns arise in connection with repair of windshields. One area of concern relates to the ease of use of the windshield repair apparatus. In particular, the ease in which the site is prepared, and the ease of application of the repair material are concerns. Accessibility to the site for the application of the repair material, and removal of impurities (e.g. air, moisture, dirt) from the break site and from the repair material are concerns. Visual access is also desired. In addition, the application of pressure above atmospheric pressure and the application of pressure below atmospheric pressure at the break site are desirable. Mechanical engagement of portions of the break site is also desirable. A goal of the repair process is to leave an optically invisible or virtually invisible repair site. Minimizing repair material waste is also a concern.

There is a need in the prior art for apparatus and methods which address the above concerns and other concerns.

SUMMARY

The present invention relates to a windshield repair apparatus including a support apparatus or bridge for holding an injector adjacent to a break area of a windshield. The windshield repair apparatus includes a suction cup for mounting the bridge to the windshield. Preferably, the injector is moveable, such as for inspection of the repair site or for adjustment of proper positioning of the injector.

In one preferred embodiment, the windshield repair apparatus includes an arm attachment location for attaching an arm to the windshield repair apparatus. The arm is preferably an articulating arm which is moveable in multiple positions and maintains the selected position. Preferably, a distal end of the arm can hold an implement or equipment for the technician, including a flashlight, a tool holder, and/or a sun shade. Other portions of the arm can hold equipment, such as an intermediate portion.

In one preferred embodiment, the articulating arm can include a tool holder in the form of a clip for a flashlight. In another preferred embodiment, the articulating arm can include a tool holder in the form of a magnet. In a further preferred embodiment, the articulating arm can include a light blocking device, or sun shade, for shading of the repair site. In another preferred embodiment, the articulating arm can include both a tool holder and a light blocking device.

The arm can include a quick connect feature allowing for rapid changing of the arm and/or the implement on the arm, including the flashlight holder, the tool holder, and/or the light blocker device. One preferred embodiment of a quick connect includes bayonet pins, and mating slots. A spring can be provided to maintain the connection between the disconnectable elements.

DETAILED DESCRIPTION OF THE PREFERRED EMBODIMENT

Figure 1:
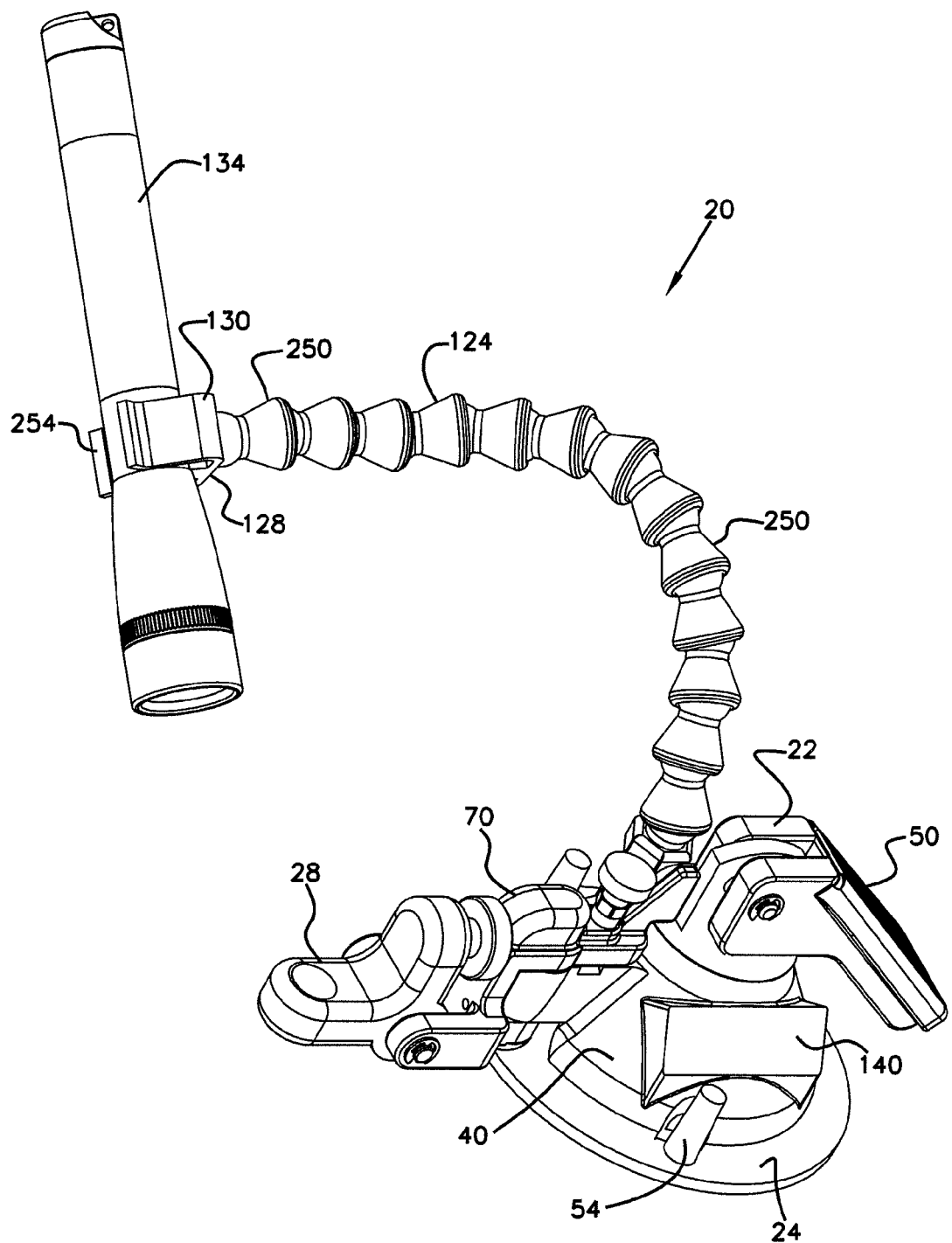
FIG. 1 is a perspective view of one preferred embodiment of a windshield repair apparatus.
Figure 2:
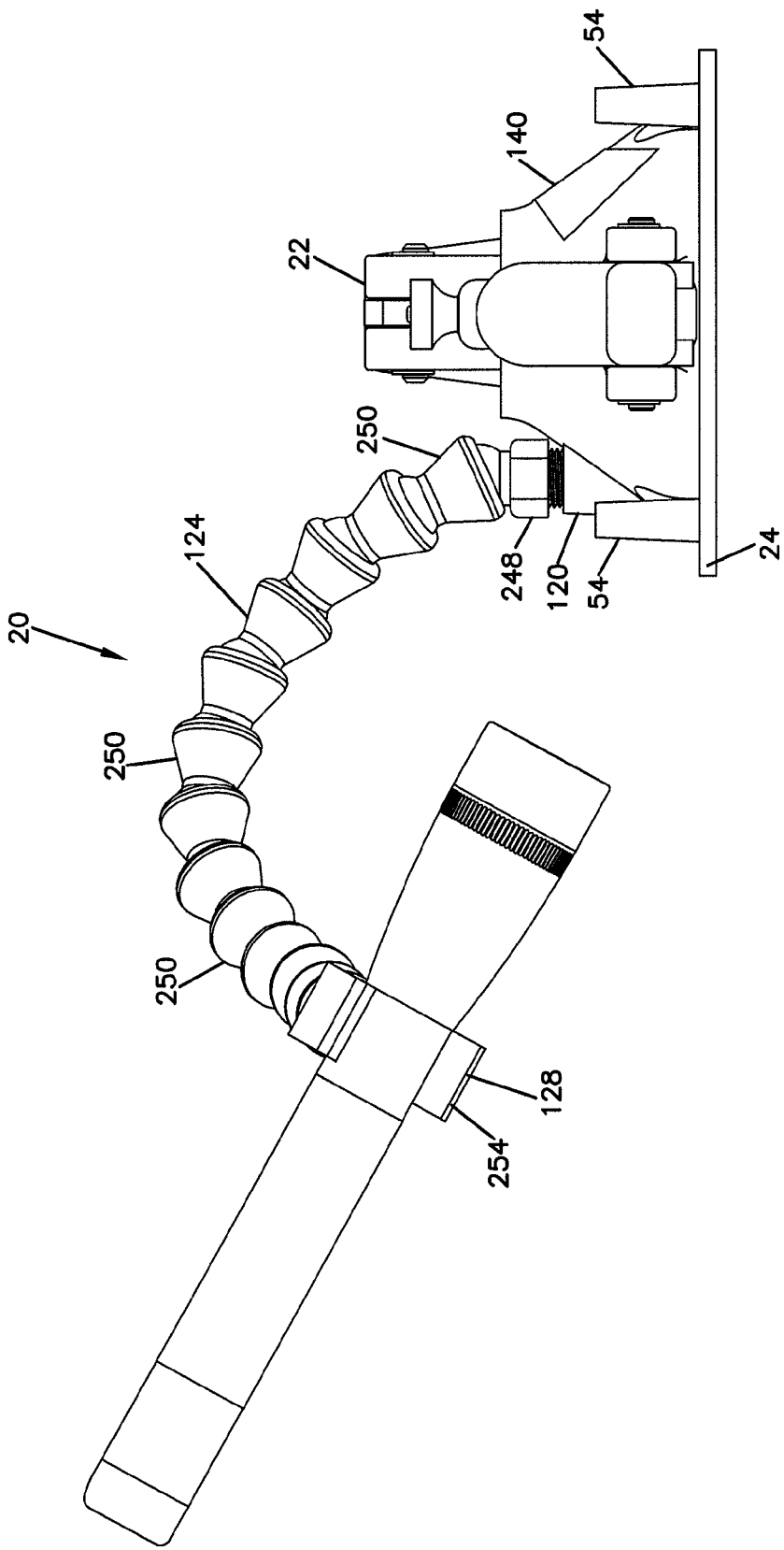
FIG. 2 is a front view of the windshield repair apparatus of FIG. 1.
Figure 3:
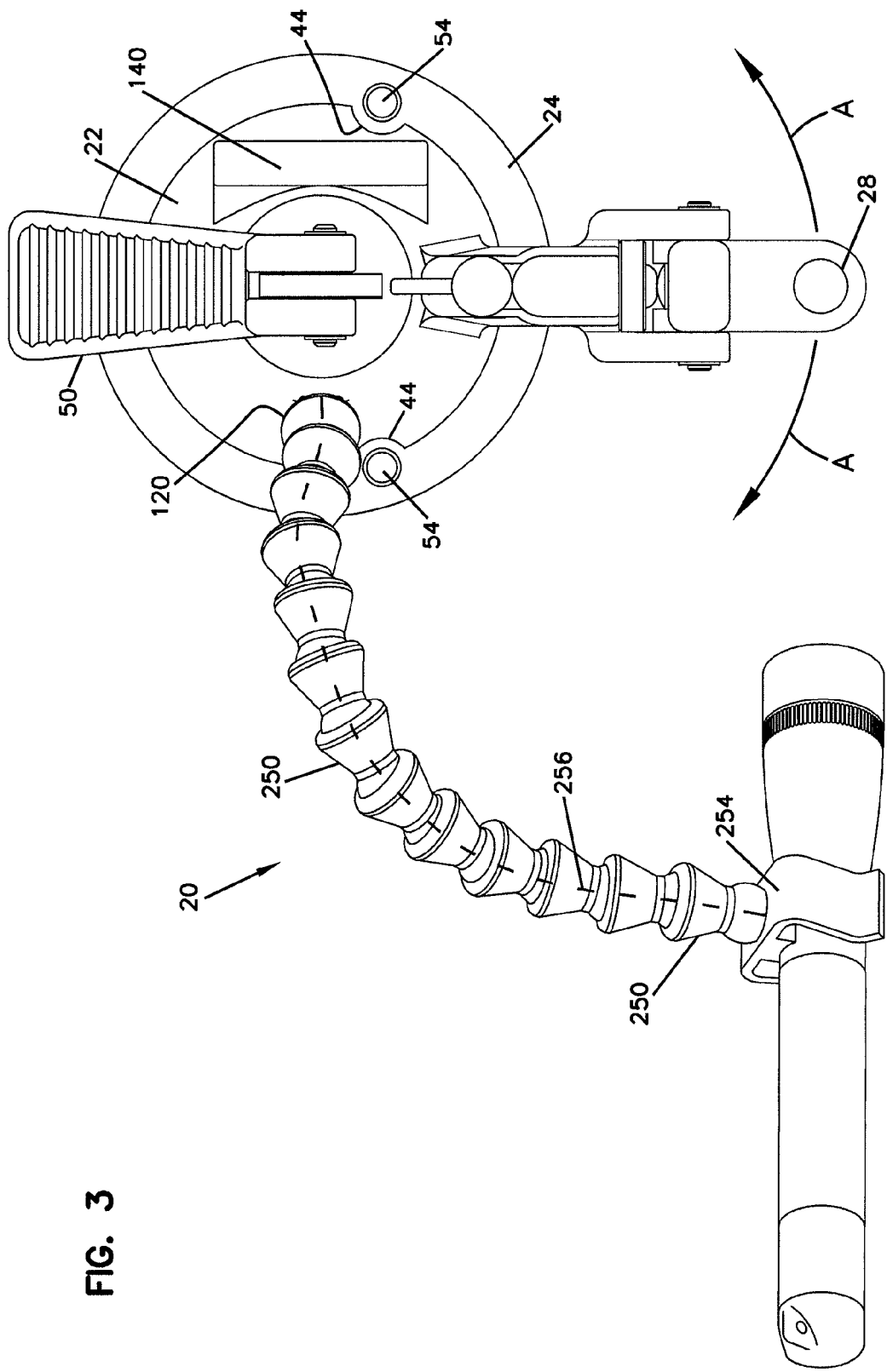
FIG. 3 is a top view of the windshield repair apparatus of FIG. 1.
Figure 4:
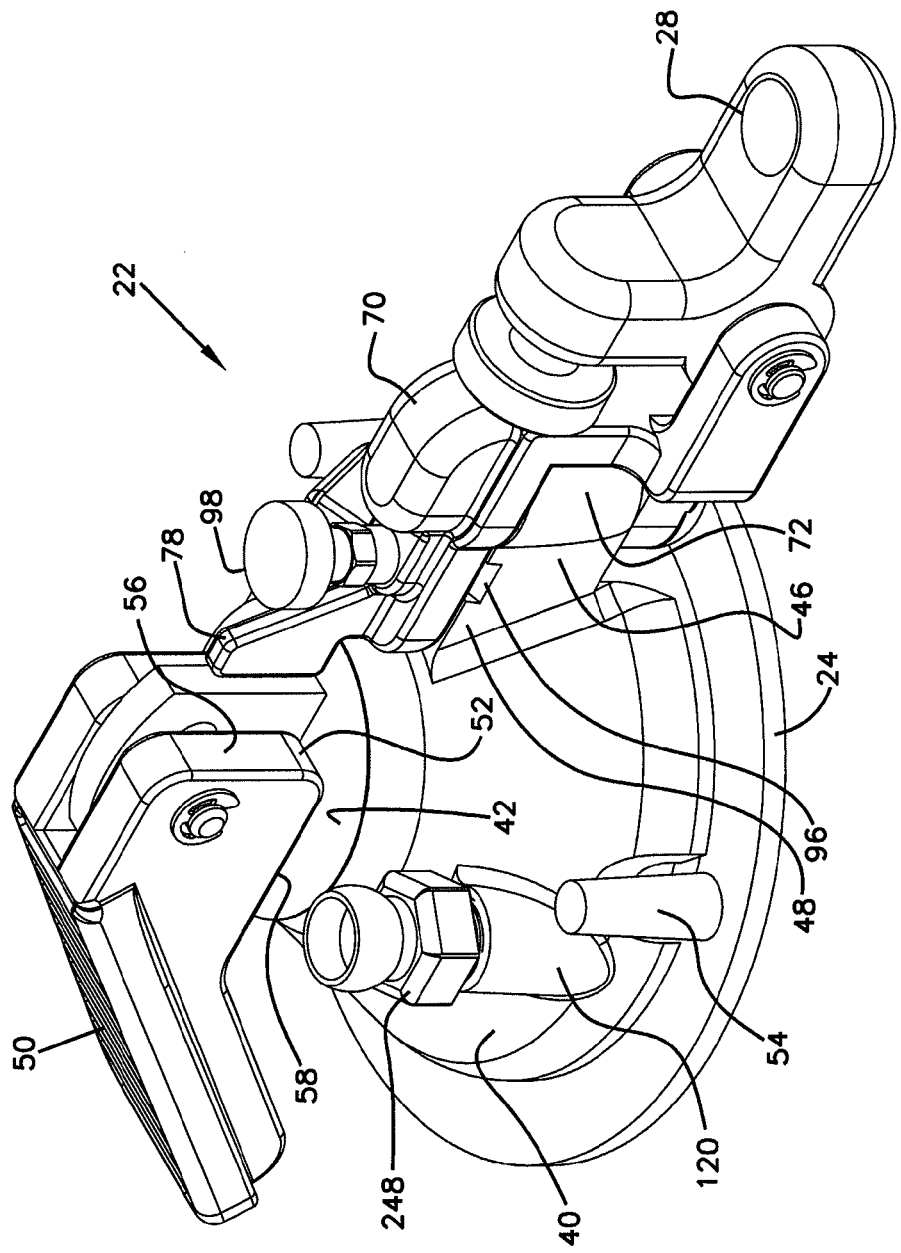
FIG. 4 is a perspective view of the windshield repair apparatus, with the arm removed.
Figure 5:
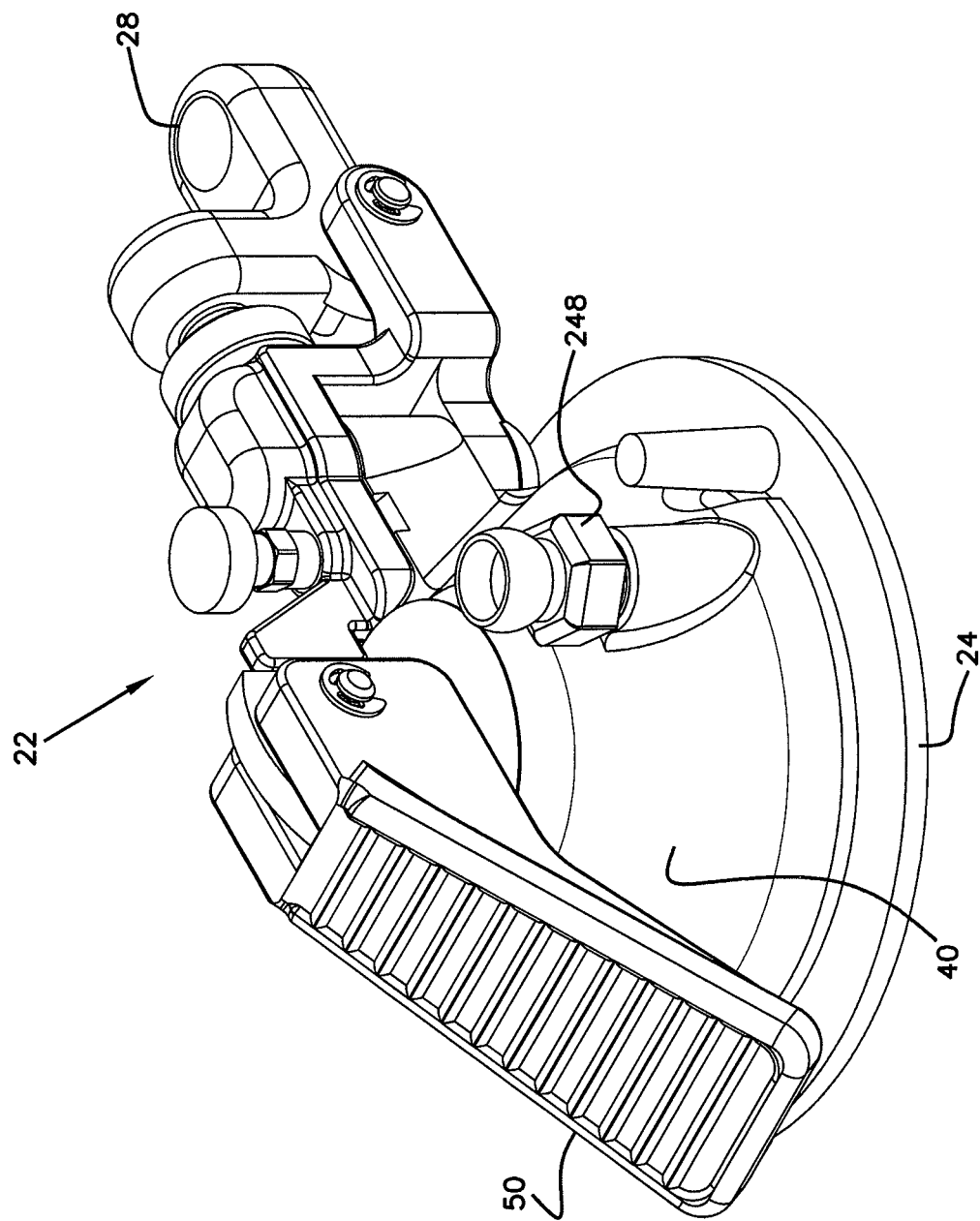
FIG. 5 is a further perspective view of the apparatus of FIG. 4.
Figure 6:
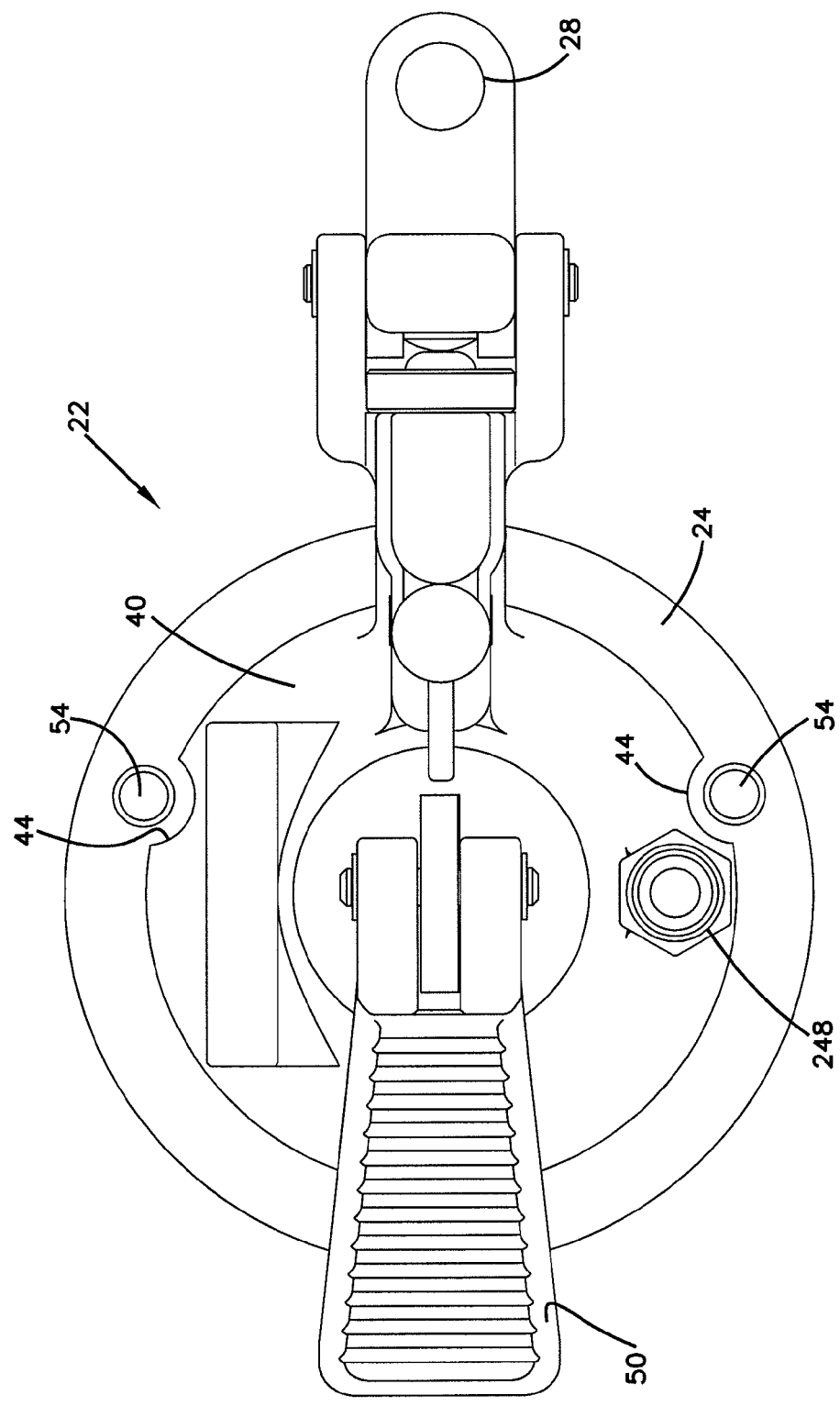
FIG. 6 is a top view of the windshield repair apparatus shown in FIGS. 4 and 5.
Figure 7:
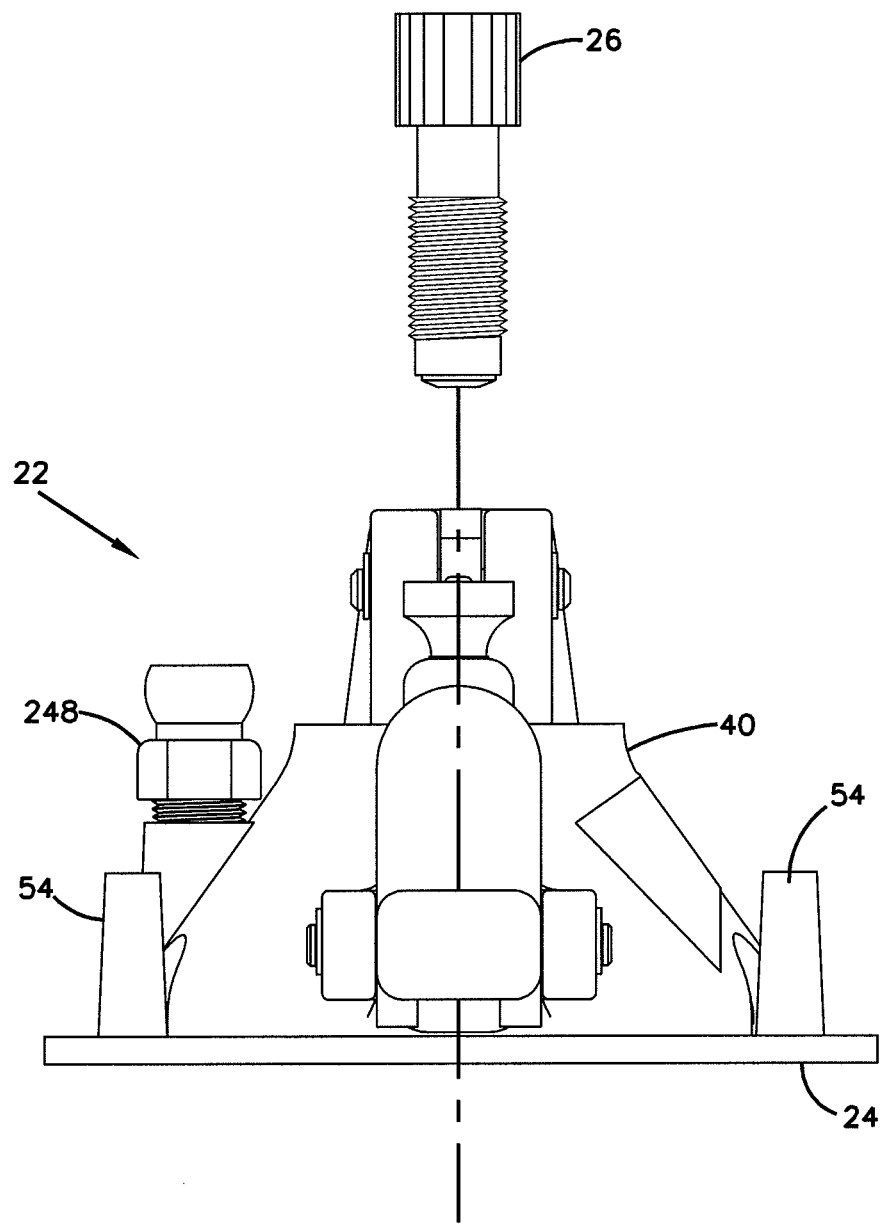
FIG. 7 is a first end view of the windshield repair apparatus of FIG. 4.
Figure 8:
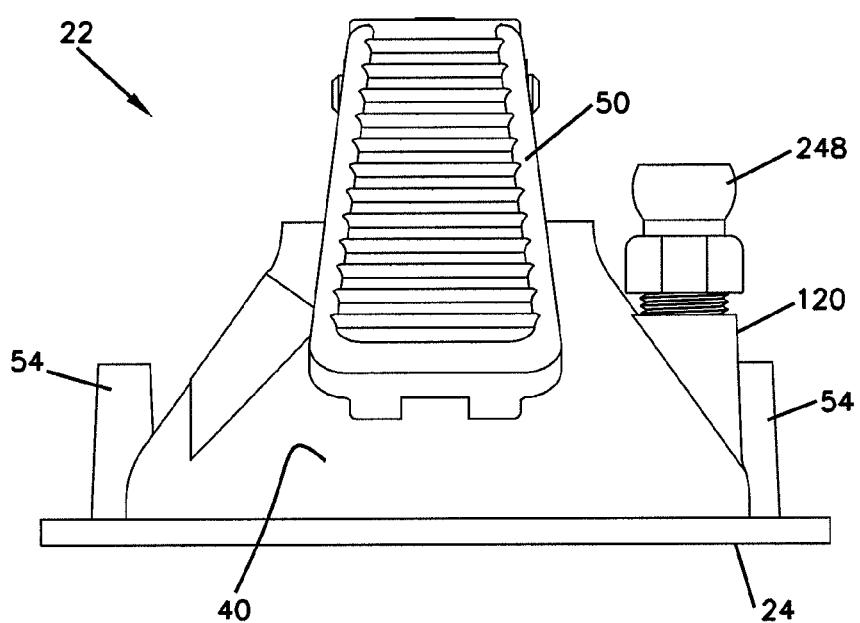
FIG. 8 is an opposite end view of the windshield repair apparatus of FIG. 4.
Figure 9:
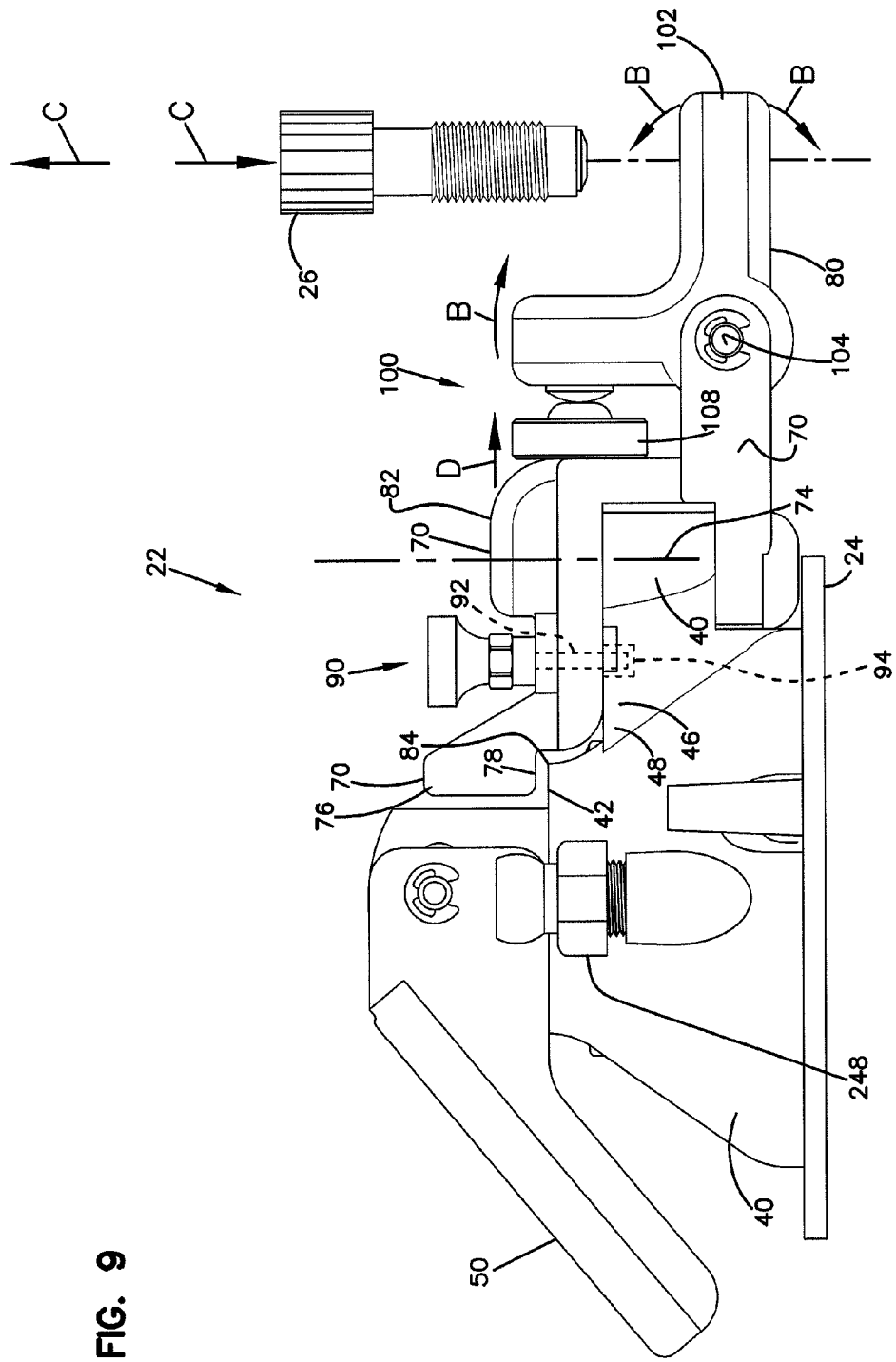
FIG. 9 is a side view of the windshield repair apparatus of FIG. 4.

Referring now to FIGS. 1-9, a first embodiment of a windshield repair apparatus 20 is shown. Apparatus 20 includes a support apparatus or bridge 22 which mounts to a top surface of a windshield with a resilient suction cup 24. Suction cup 24 supports bridge 22 on the windshield. Bridge 22 holds an injector 26 in opening 28 adjacent to a break area on a windshield for the application of repair resin, such as ultraviolet light curable plastic resin. In addition, injector 26 can be used to apply air pressure above and below atmospheric pressure to the break area. Further, injector 26 facilitates use of a tool to mechanically engage the break area to facilitate repair during the application of pressure (plus or minus) and/or the repair material. Further details of an example injector 26 useful in the present invention are shown in U.S. Pat. No. 5,565,217, the disclosure of which is incorporated by reference. It is to be appreciated that injector 26 can mount to bridge 22 by a threaded engagement, a bayonet (e.g., quarter twist) arrangement, or other arrangement.

Bridge 22 includes a base 40 which mounts to suction cup 24 with a latch 50. Latch 50 lifts a central portion of suction cup 24 upwardly to cause latching of suction cup 24 on the windshield. Latch 50 is an over center latch which includes corners 52 and sides 56, 58 which engage a top 42 of base 40. Top 42 can be additional wear plate or washer as shown, positioned on a top of the base body. Latch 50 is shown in the latched position in the FIGS. Latch 50 pivots upward to unlatch the suction cup 24.

Suction cup 24 includes projections 54 which can be used to help remove suction cup 24 from the windshield when latch 50 is unlatched. Projections 54 are pulled upwardly to release the suction on the windshield. Projections 54 are positioned in edge cutouts 44 of base 40.

Bridge 22 includes an arm 70 which is pivotally mounted about a hinge 72 defining a pivot axis 74 which is generally perpendicular to the windshield. Arm 70 includes a forward portion 80 defining the injection holder, and a rearward portion 82. Rearward portion 82 includes a registration system 90 which allows for securement of arm 70 to a remainder of base 40 at base area 46. Registration system 90 includes a pin 92 and a slot 94. Ramps 96 can lead to slot 94 so that pin 92 will automatically fall into slot 94 once arm 70 is rotated back to the repair position. To rotate arm 70 away from the repair position, to an inspection position, pin 92 is pulled upwardly out of slot 94. Pin 92 is spring loaded. Pin 92 includes a handle 98. Further details of a similar registration system are shown for example in U.S. Pat. No. 6,302,670, the disclosure of which is hereby incorporated by reference. Arm 70 moves in the direction of arrows A in the FIGS.

In the repair position, arm 70 is generally aligned with the sidewalls 48 of base area 46 to further facilitate ease of use. Further details of the aligned sidewalls are shown for example in U.S. Pat. No. 6,139,300, the disclosure of which is hereby incorporated by reference. Arm 70 includes an upper tab 76 with a small notch 78 which receives a corner 84 of top 42 of base 40.

Forward portion 80 of arm 70 preferably includes a threaded adjustment mechanism 100 which allows for injector 26 to be moved toward and away from the windshield, such as for use on curved portions of the windshield in the direction of arrows B. Injector 26 is also threadably adjustable, as described above for vertical adjustment in the direction of arrows C. Threaded adjustment mechanism 100 includes a front end portion 102 which is hinged at a hinge 104 about a pivot axis 106 which is generally parallel to the windshield. A threaded adjustment screw 108 moves in the direction of arrow D to move front end portion 102 in the direction of arrows B. Front end portion 102 is spring loaded away from the windshield. Further details of the threaded adjustment mechanism 100 and various mounts for injector 26 are shown for example in U.S. Pat. No. 6,139,300, the disclosure of which is incorporated by reference.

Windshield repair apparatus 20 includes an arm attachment location 120 which permits attachment of an arm 124. Preferably, arm 124 is an articulating arm which allows for a plurality of positions for distal end 128. Arm 124 is flexible in three dimensions and maintains its shape positioned by the user. Distal end 128 defines a clip 130. Clip 130 can hold a flashlight 134, such as for illuminating repair area for the technician. Distal end 128 can have other constructions as desired.

Arm 124 includes a first connector 248, a plurality of female/male connectors 250, and a distal connector 254. The first connector 248 is threaded for threadably mounting to base 40. Each of the elements of arm 124 includes one of the mating ball and socket connection ends which allow for three-dimensional bending movement, and rotation about the central arm axis 256. More elements can be added if a longer arm 124 is desired. A shorter arm 124 can be assembled with less connectors 250. Arm 124 is selectively attachable/detachable from base 40 as desired by the user. Arm 124 can be made from other constructions that allow movement of the distal end 128. Arm attachment location 120 is located on an opposite side of base 40 from label area 140. Arm 124 is positioned so it does not interfere with moveable latch 50 or moveable arm 70 which holds injector 70.

Figure 10:
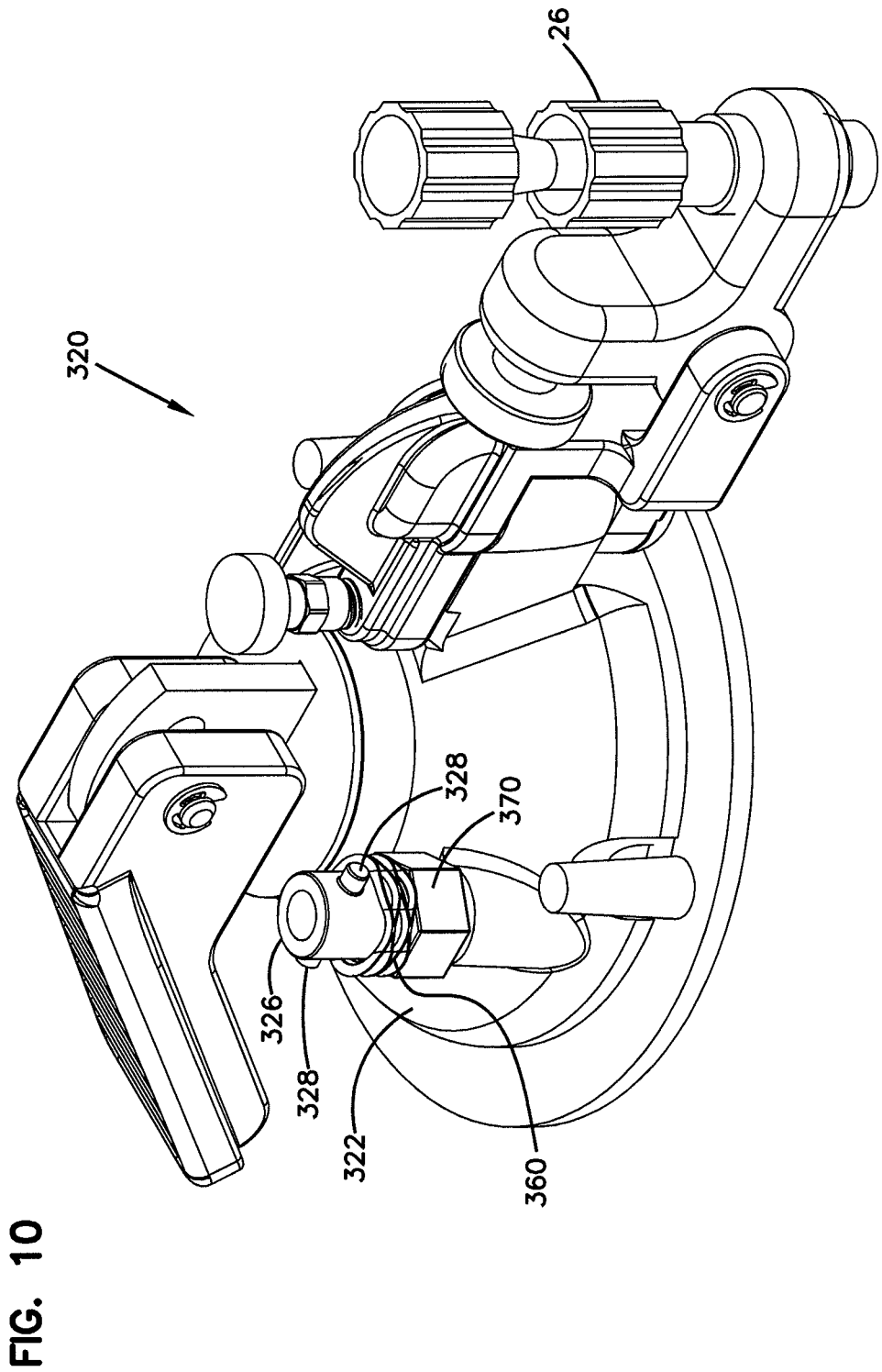
FIG. 10 is a perspective view of another preferred embodiment of a windshield repair apparatus.
Figure 11:
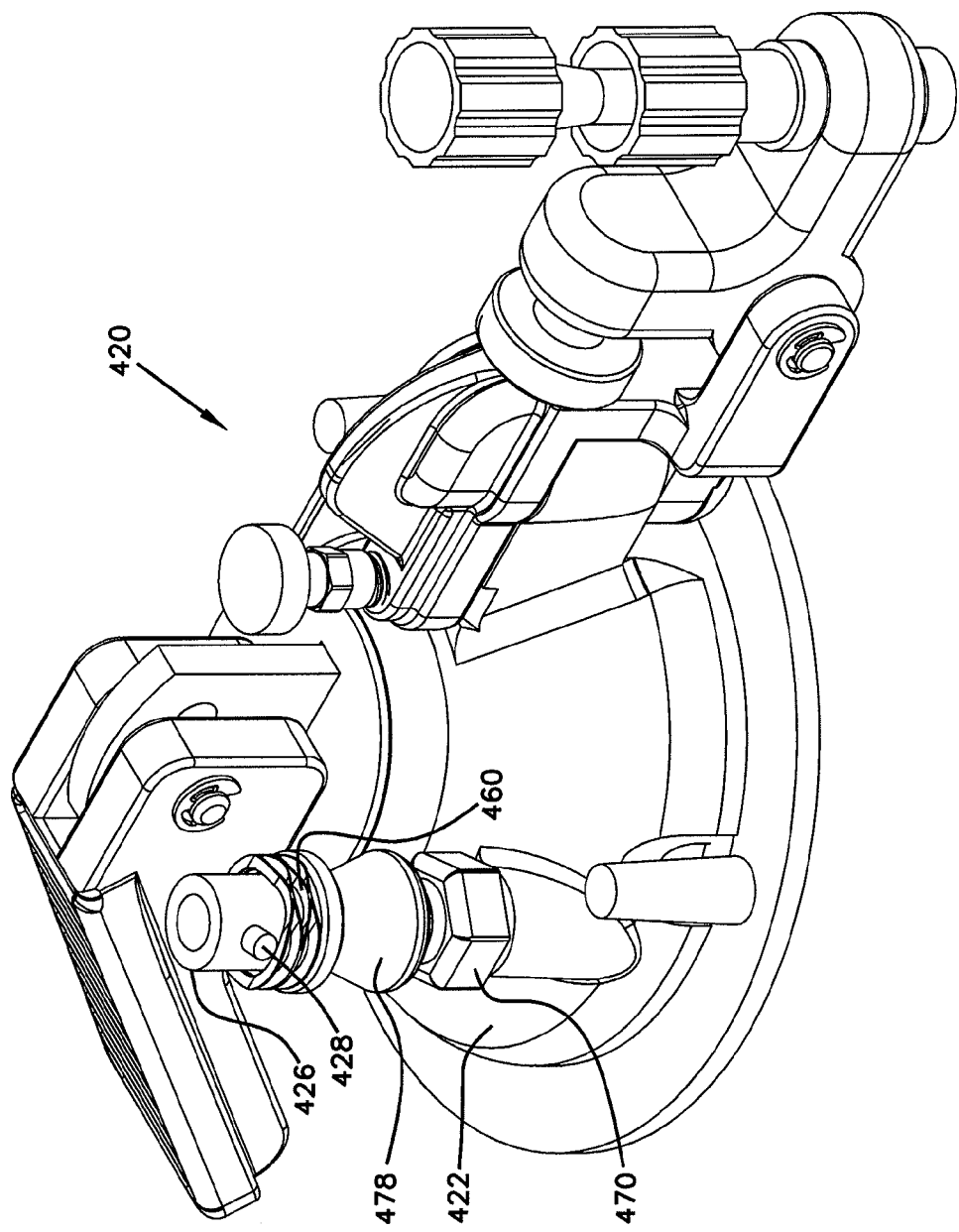
FIG. 11 is a perspective view of a still further preferred embodiment of a windshield repair apparatus.
Figure 12:
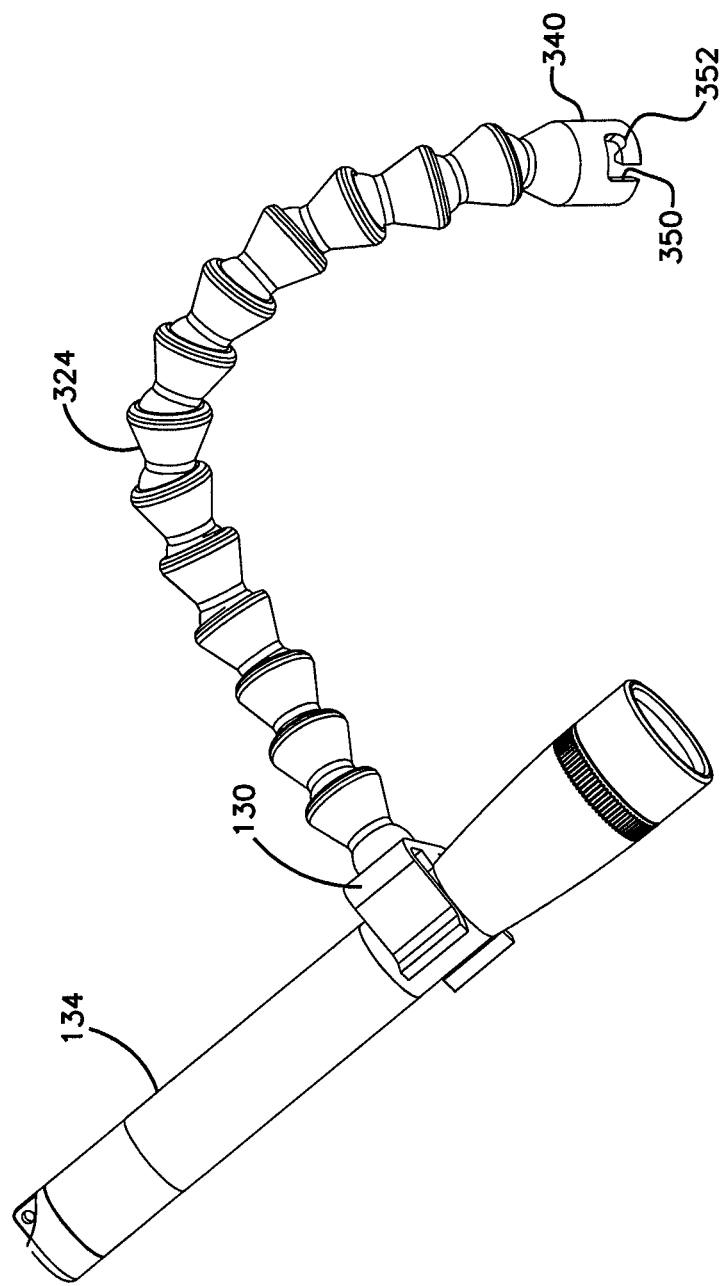
FIG. 12 is a perspective view of an articulating arm with a flashlight holder usable on the windshield repair apparatus of FIGS. 10 and 11 including a quick connect feature.

Referring now to FIGS. 10-12, two alternative windshield repair apparatus 320 and 420 are shown including a quick connect feature for articulating arm 324. Each bridge 322, 422 includes a first sleeve 326, 426 each including two bayonet pins 328, 428. Arm 324 of FIG. 12 can be quickly connected to or disconnected from bridges 322, 422 with a quick connect outer sleeve 340 which fits over first sleeves 326, 426. Sleeve 340 includes bayonet slots 350 which receive bayonet pins 328, 428, respectively. Bayonet slots 350 are L-shaped and include an end pocket 352. Bayonet pins 328, 428 reside in pockets 352 to securely hold arm 324 to either of bridges 322, 422. A spring 360, 460 biases sleeve 340 away from bridge 322, 422 and maintains bayonet pins 328, 428 in pockets 352. Spring 360, 460 is in the form of a wave washer. The wave washer can be twisted onto sleeves 326, 426 during assembly. By pressing downwardly against springs 360, 460, outer sleeve 340 can be moved downwardly toward bridges 322, 422 and sleeve 340 rotated to remove bayonet pins 328, 428 from slots 350 and outer sleeve 340 from first sleeves 326, 426. This allows for a quick connect or disconnect of articulating arm 324 as desired.

Bridge 322 includes a threaded nut 370 connected to sleeve 326. Bridge 422 includes a threaded nut including a ball joint for mating with connector element 478 including sleeve 426.

Figure 13:
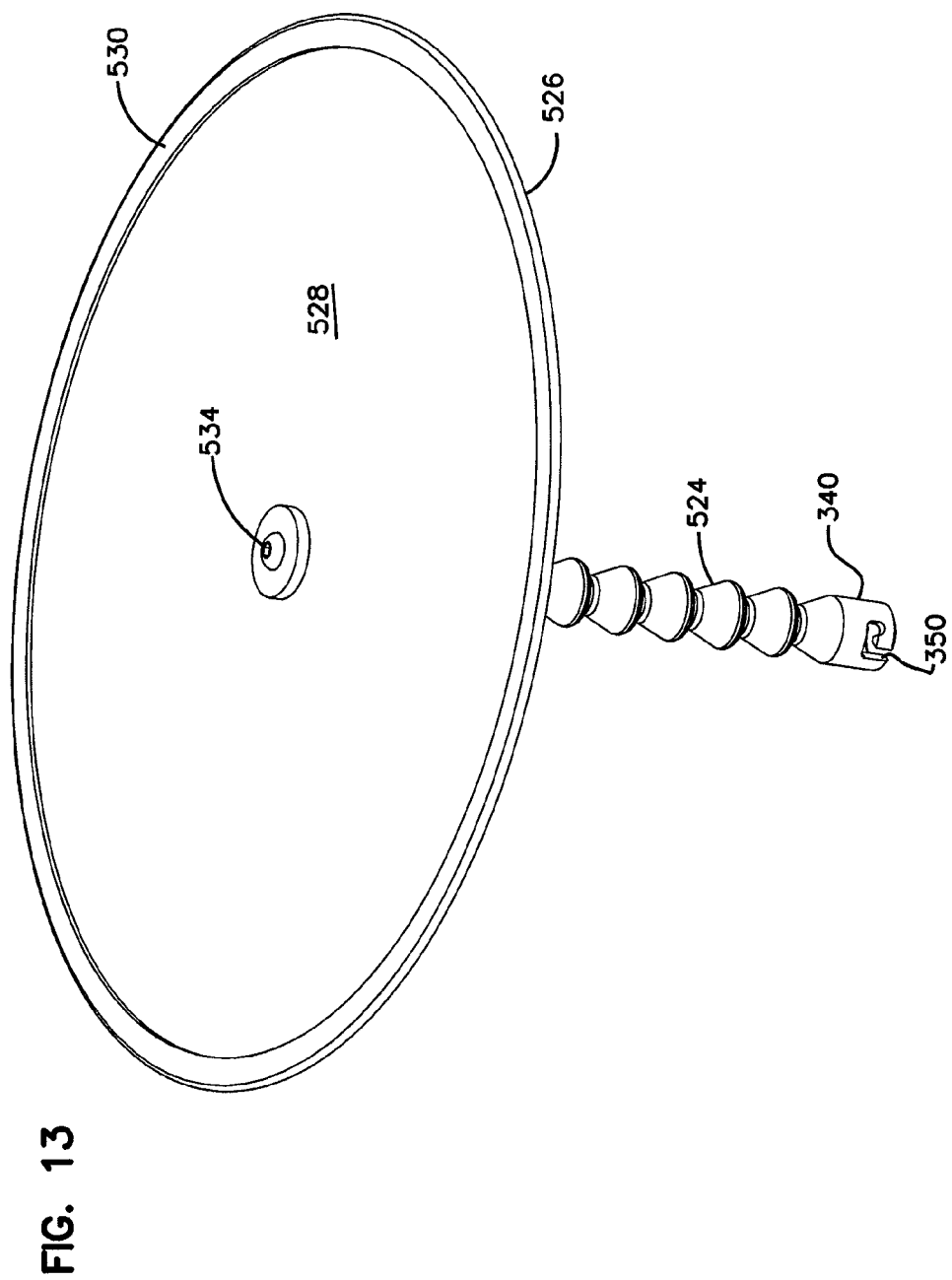
FIGS. 13 and 14 are perspective views of an alternative articulating arm including a light blocker device usable on the windshield repair apparatus of FIGS. 10 and 11.
Figure 14:
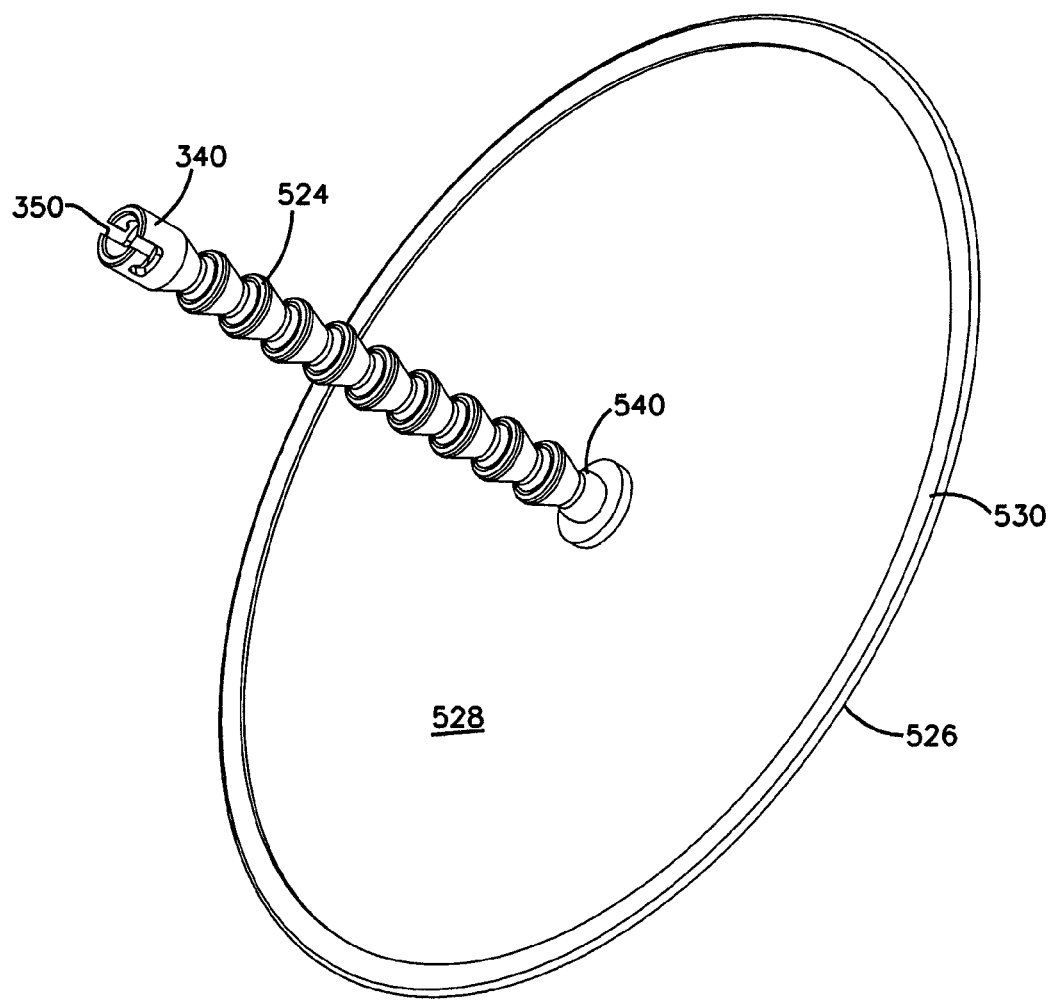

Referring now to FIGS. 13 and 14, articulating arm 524 includes a quick disconnect sleeve 340 at one end 538. At a distal end 540 of articulating arm 524, a light blocker device 526 in the form of a circular disk is provided. Light blocker device 526 can provide shade over a repair site, if desired by the technician. Light blocker device 526 can be in the form of a fabric material main portion 528 with a reinforcing outer rim 530. Such a construction may facilitate compact storage by manipulation of the disk into a smaller shape by folding and/or twisting. Light blocker device 526 can be attached with a fastener 534 to arm 524.

Figure 15:
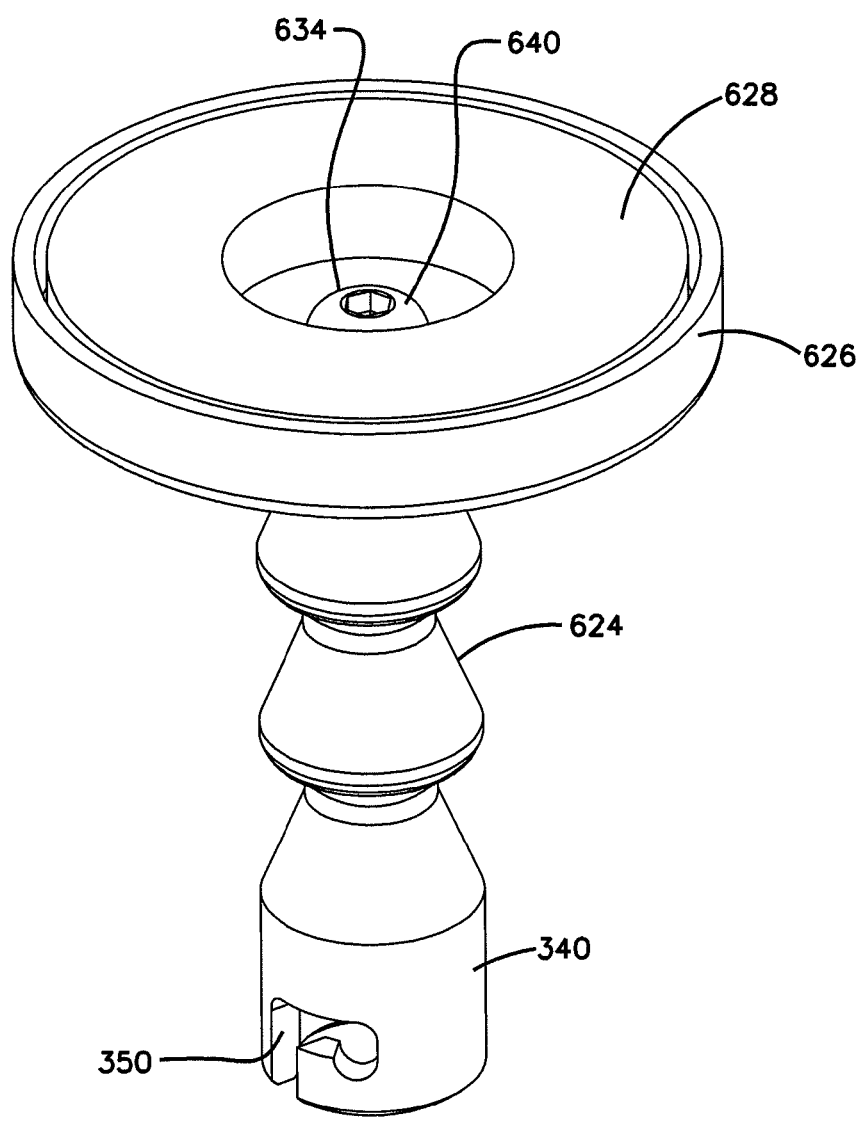
FIG. 15 is a perspective view of an alternative articulating arm including a magnetic tool holder usable on the windshield repair apparatus of FIGS. 10 and 11.

Referring now to FIG. 15, an articulating arm 624 includes a quick connect sleeve 340 at one end 638 and a tool holder 626 at an opposite end 640. Tool holder 626 includes a magnetic member 628 for magnetically attaching to tools the technician places on magnetic member 628 for temporary securement. Tool holder 626 is attachable with a fastener 634 to arm 624.

Figure 16:
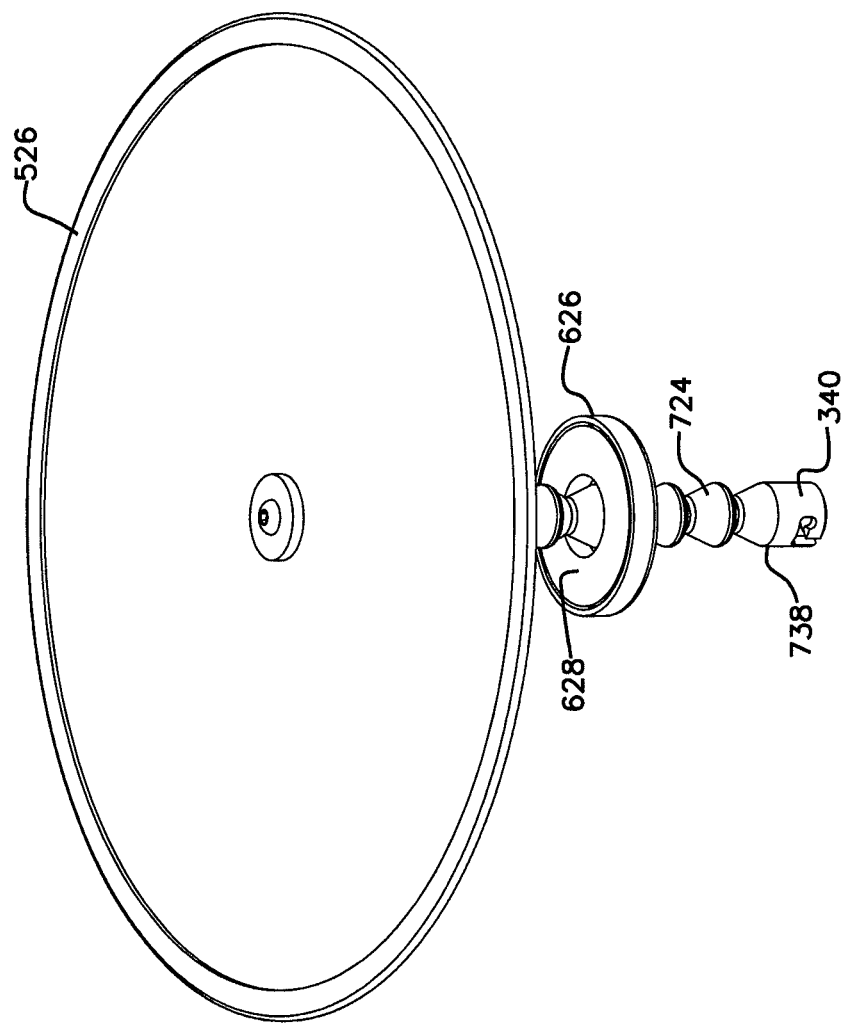
FIGS. 16 and 17 are perspective views of an alternative embodiment of an articulating arm including a magnetic tool holder and a light blocker device usable on the windshield repair apparatus of FIGS. 10 and 11.
Figure 17:
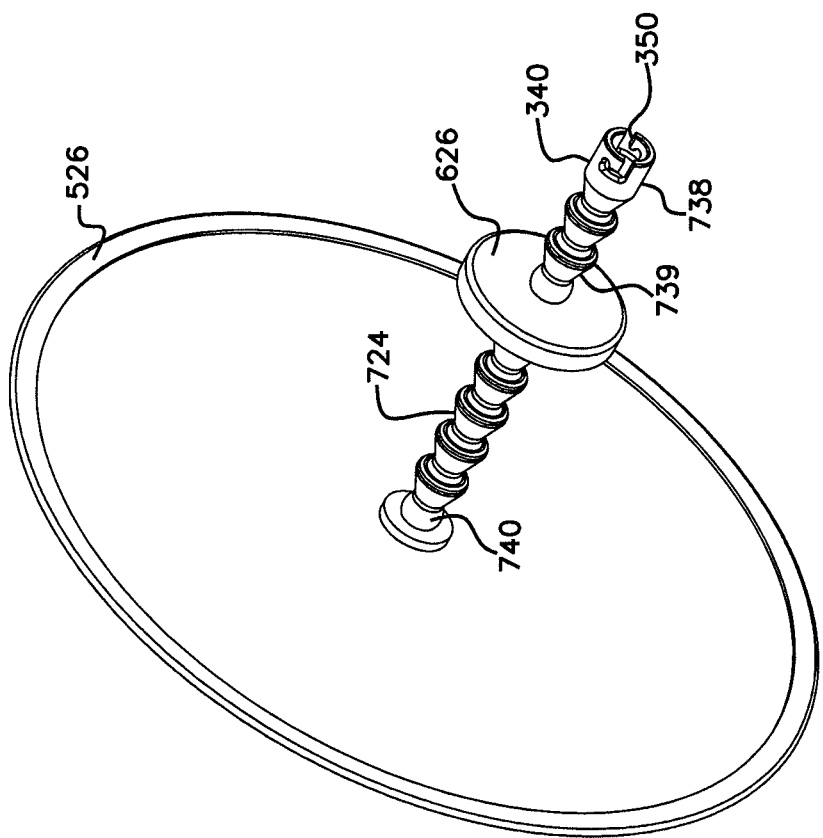

Referring now to FIGS. 16 and 17, an articulating arm 724 includes a quick connect sleeve 340 at one end 738, and includes two functional elements for a combined functionality. Articulating arm 724 includes a tool holder 626 located at an intermediate region 739 of articulating arm 724. At a distal end 740 of arm 724, a light blocker device 526 can be provided. Such a construction allow for a dual purpose articulating arm 724.

Figure 18:
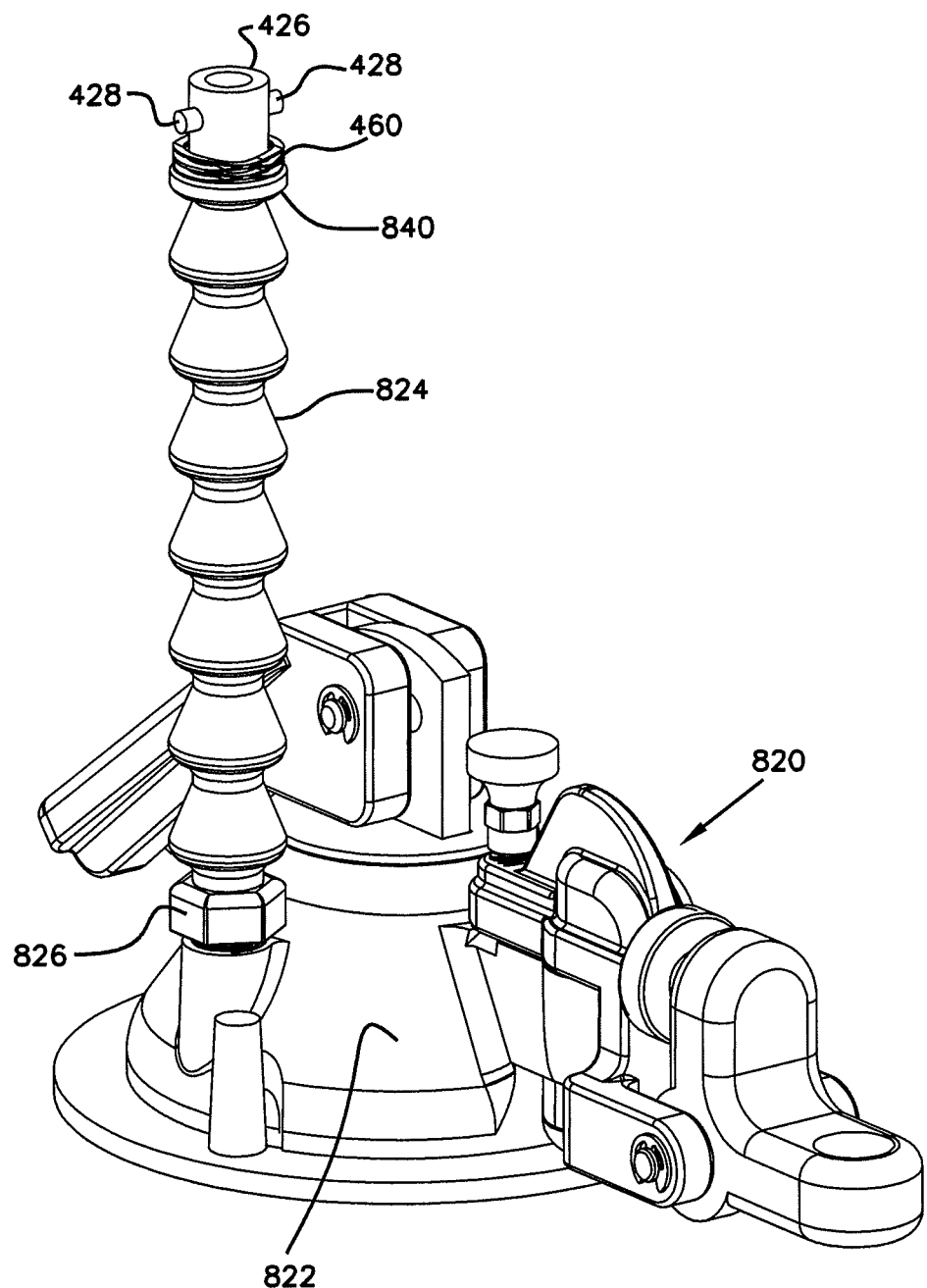
FIG. 18 is a perspective view of another preferred embodiment of a windshield repair apparatus including a quick connect device at a distal end of the articulating arm.
Figure 19:
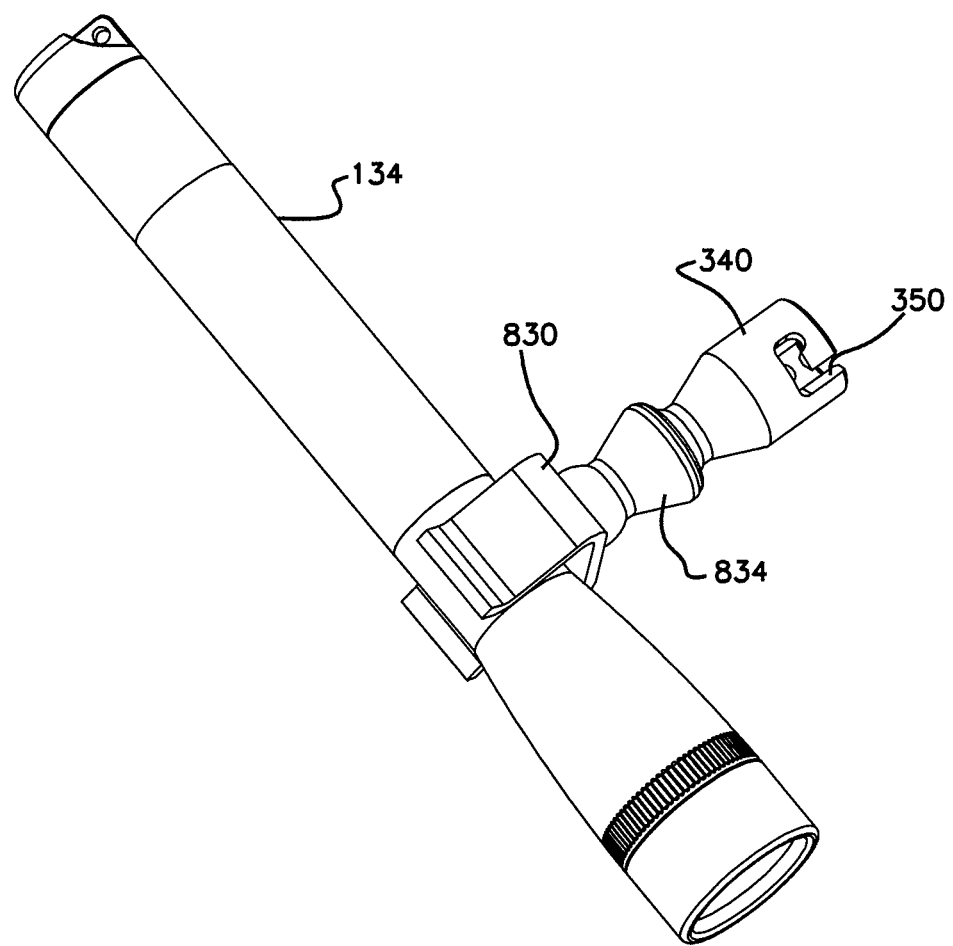
FIGS. 19-22 show various attachments attachable to the distal end of the articulating arm of the windshield repair apparatus of FIG. 18.
Figure 20:
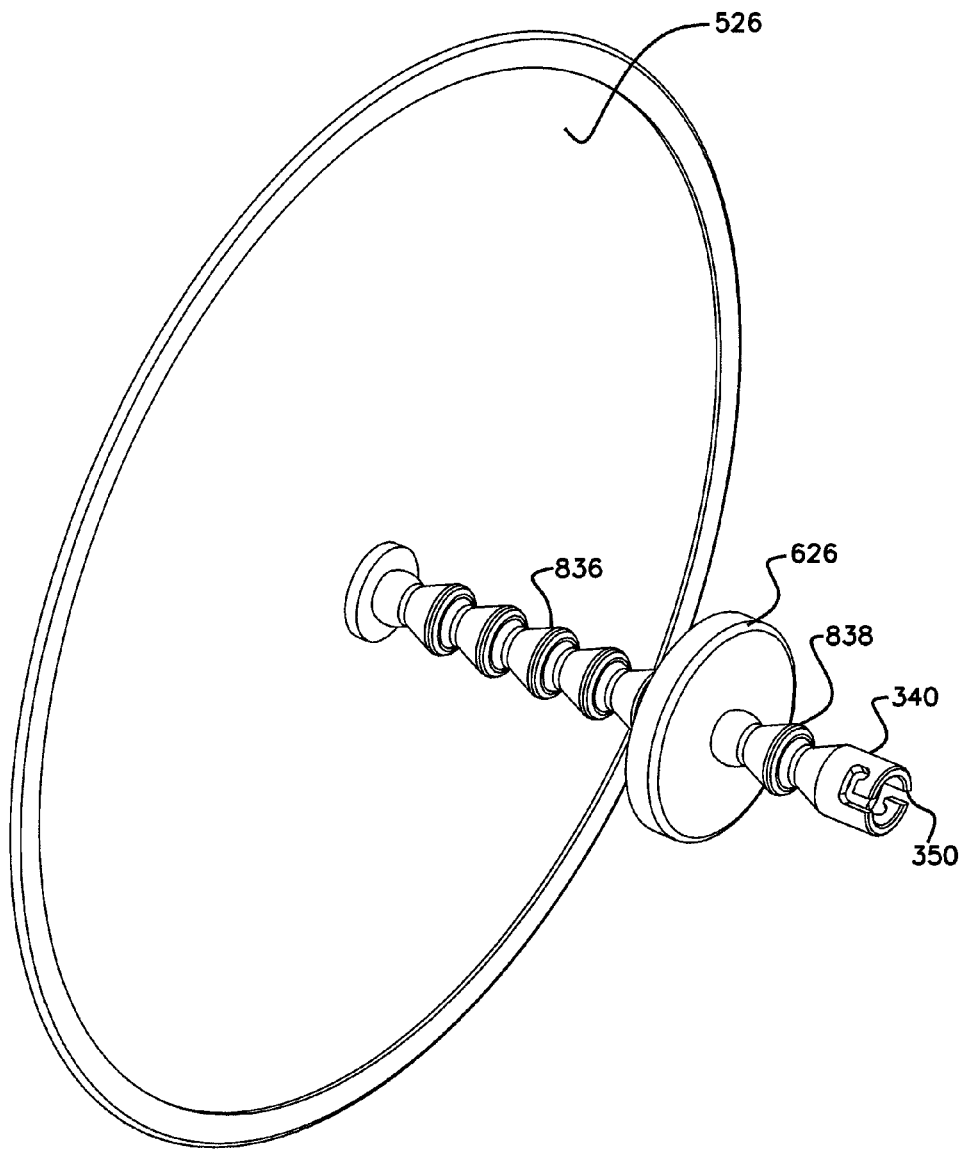
Figure 21:
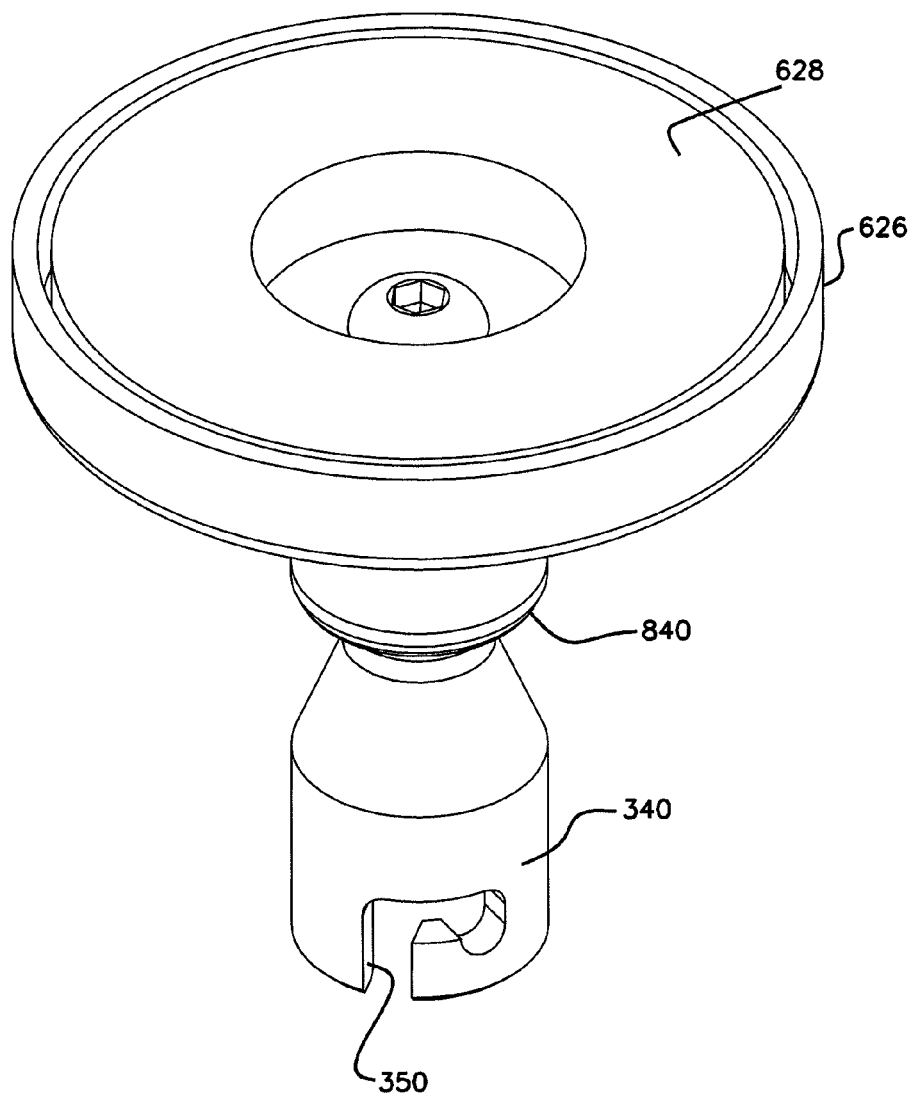
Figure 22:
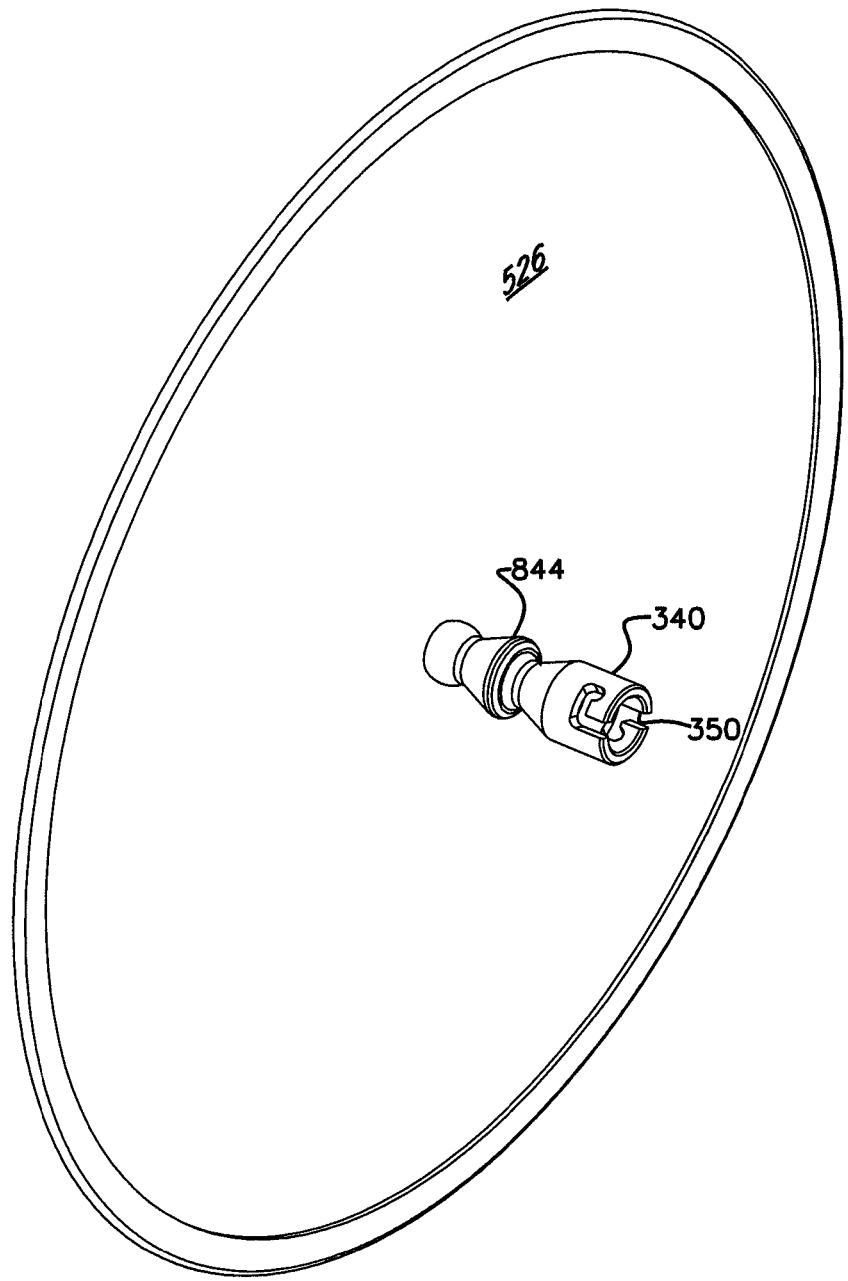

Referring now to FIG. 18, the quick connect/disconnect feature is located on repair apparatus 820 at a distal end 840 of articulating arm 824. Proximal end 826 is mounted to bridge 822 with a threaded mount similar to bridge 20 described below. By moving the quick connect/disconnect components to a distal end, and away from the bridge 822, articulating arm 824 is used with a variety of tools and it does not need to be changed each time a change in tools or functions is desired. FIG. 19 shows a flashlight attachment clip 830 with articulating arm 834 for holding a flashlight 134 to arm 824. FIG. 20 shows a combined tool holder 626 and light blocking device 526 with articulating arms 836, 838 which are attachable to arm 824. FIG. 21 shows a tool holder 626 with an articulating arm 840 attachable to arm 824. FIG. 22 shows a light blocker device 526 with an articulating arm 844 attachable to articulating arm 824.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A windshield repair apparatus for use on a windshield comprising:
a bridge having a suction cup extending from the bridge for mounting the bridge to the windshield;
the bridge including a pivotally mounted arm, the arm defining an injector holder, the arm rotatable about a first axis between an original position and a rotated position; and
the bridge including a registration system engageable with the pivotally mounted arm for allowing return of the pivotally mounted arm to the original position from the rotated position, wherein the first axis and a central axis of the suction cup are generally parallel, and wherein the pivotally mounted arm includes a back end opposite the injector holder;
an articulating arm mounted to the bridge.

2. The apparatus of claim 1, further comprising a latch mounted to the suction cup for activating the suction cup.

3. The apparatus of claim 1, wherein the registration system includes a spring loaded plunger and a detent, wherein the plunger of the registration system includes a top handle portion to facilitate gripping of the plunger by a user to permit retraction of the plunger out of engagement with the detent.

4. The apparatus of claim 1, further comprising an injector mounted to the injector holder.

5. The apparatus of claim 1, wherein articulating arm is flexible.

6. The apparatus of claim 5, wherein the articulating arm includes a distal end for holding a flashlight.

7. The apparatus of claim 5, wherein the articulating arm includes a distal end for holding a light blocking device.

8. The apparatus of claim 5, wherein the articulating arm includes a distal end for holding a tool holder.

9. The apparatus of claim 5, wherein the articulating arm includes an intermediate tool holder, and a distal end for holding a light blocking device.

10. The apparatus of claim 5, wherein the articulating arm includes a quick connect/disconnect connection joint including a rotatable bayonet mechanism.

11. The apparatus of claim 1, wherein the pivotally mounted arm has a front end defining the injector holder, the front end rotatable about a second axis relative to a remainder of the arm, the front end rotatable toward and away from the general direction faced by the suction cup.

12. The apparatus of claim 11, further comprising a threaded adjustment mechanism for selectively positioning the front end of the arm relative to the remainder of the arm.

13. The apparatus of claim 12, wherein the threaded adjustment mechanism includes a spring biasing the front end in a direction away from the windshield.

14. A windshield repair apparatus for use on a windshield comprising:
a bridge having a suction cup extending from the bridge for mounting the bridge to the windshield;
the bridge including an arm pivotally mounted for movement toward and away from the windshield, the arm defining an injector holder, wherein the pivotally mounted arm has a front end rotatable about a first axis relative to a remainder of the arm in a direction toward and away from the windshield;
the bridge including a threaded adjustment mechanism for moving the front end of the arm toward and away from the windshield;
an articulating arm mounted to the bridge.

15. The apparatus of claim 14, wherein the threaded adjustment mechanism includes a spring biasing the arm away from the windshield.

16. The apparatus of claim 15, further comprising an injector mounted to the injector holder.

17. The apparatus of claim 15, wherein articulating arm is flexible.

18. The apparatus of claim 17, wherein the articulating arm includes a distal end for holding a flashlight.

19. The apparatus of claim 17, wherein the articulating arm includes a distal end for holding a light blocking device.

20. The apparatus of claim 17, wherein the articulating arm includes a distal end for holding a tool holder.

21. The apparatus of claim 17, wherein the articulating arm includes an intermediate tool holder, and a distal end for holding a light blocking device.

22. The apparatus of claim 17, wherein the articulating arm includes a quick connect/disconnect connection joint including a rotatable bayonet mechanism.

23. A windshield repair apparatus for use on a windshield comprising:
a bridge having a suction cup extending from the bridge for mounting the bridge to the windshield;
the bridge including a pivotally mounted arm, the arm defining an injector holder, the arm rotatable about a first axis between an original position and a rotated position; and
the bridge including a registration system engageable with the pivotally mounted arm for allowing return of the pivotally mounted arm to the original position from the rotated position, wherein the pivotally mounted arm has a front end defining the injector holder, the front end rotatable about a second axis relative to a remainder of the arm in a direction toward and away from the windshield;
an articulating arm mounted to the bridge.

24. The apparatus of claim 23, further comprising an injector mounted to the injector holder.

25. The apparatus of claim 23, wherein articulating arm is flexible.

26. The apparatus of claim 25, wherein the articulating arm includes a distal end for holding a flashlight.

27. The apparatus of claim 25, wherein the articulating arm includes a distal end for holding a light blocking device.

28. The apparatus of claim 25, wherein the articulating arm includes a distal end for holding a tool holder.

29. The apparatus of claim 25, wherein the articulating arm includes an intermediate tool holder, and a distal end for holding a light blocking device.

30. The apparatus of claim 25, wherein the articulating arm includes a quick connect/disconnect connection joint including a rotatable bayonet mechanism.

31. A windshield repair apparatus for use on a windshield comprising:
a bridge having a suction cup extending from the bridge for mounting the bridge to the windshield;
the bridge defining an injector holder;
an articulating arm mounted to the bridge; and
an injector mounted to the injector holder.

32. The apparatus of claim 31, further comprising a latch mounted to the suction cup for activating the suction cup.

33. The apparatus of claim 31, wherein the articulating arm includes a holder for holding a flashlight.

34. The apparatus of claim 31, wherein the articulating arm includes a light blocking device.

35. The apparatus of claim 31, wherein the articulating arm includes a tool holder.

36. The apparatus of claim 31, wherein the articulating arm includes an intermediate tool holder, and a distal end including a light blocking device.

37. The apparatus of claim 31, wherein the articulating arm includes a quick connect/disconnect connection joint.

38. The apparatus of claim 37, wherein the quick connect/disconnect connection joint includes a rotatable bayonet mechanism.

* * * * *